US006365640B2

(12) United States Patent
Baba et al.

(10) Patent No.: US 6,365,640 B2
(45) Date of Patent: Apr. 2, 2002

(54) SILICONE RUBBER SPONGE COMPOSITION AND SPONGE ARTICLES THEREFROM

(75) Inventors: Katsuya Baba; Manabu Suto; Hiroshi Honma; Akito Nakamura, all of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/862,835

(22) Filed: May 23, 2001

Related U.S. Application Data

(62) Division of application No. 09/800,326, filed on Mar. 6, 2001.
(51) Int. Cl.$^7$ .................................................. C08J 9/32
(52) U.S. Cl. .......................... 521/54; 521/65; 521/134; 521/154
(58) Field of Search ............................ 521/54, 65, 134, 521/154

(56) References Cited

U.S. PATENT DOCUMENTS 5,973,060 A * 10/1999 Ozaki et al. ................ 521/154

* cited by examiner

Primary Examiner—Morton Foelak
(74) Attorney, Agent, or Firm—James L. De Cesare

(57) ABSTRACT

A silicone rubber sponge composition, a silicone rubber sponge, and a process for making a silicone rubber sponge. The silicone rubber sponge composition comprises (A) 100 parts by weight of an organopolysiloxane gum described by average structural unit $R_a SiO_{(4-a)/2}$, where R is a monovalent hydrocarbon radical or haloalkyl and a is 1.95 to 2.05, (B) 1 to 400 parts by weight of an inorganic filler, (C) 0.01 to 50 parts by weight hollow thermoplastic resin particles (D) a mixture of (a) water-soluble silicone and (b) water in an amount such that the water in the mixture is equivalent to 0.01 to 10 parts by weight per 100 parts by weight of component (A), and (E) a curing agent in an amount sufficient to cure the composition.

14 Claims, No Drawings

SILICONE RUBBER SPONGE COMPOSITION AND SPONGE ARTICLES THEREFROM

This application is a division of our prior copending U.S. application Ser. No. 09/800,326, filed Mar. 6, 2001.

FIELD OF THE INVENTION

The present invention relates to a silicone rubber sponge composition, to a silicone rubber sponge, and to a process for production of a silicone rubber sponge. More particularly, it relates to a silicone rubber sponge composition that does not give rise to harmful decomposition products during sponge production and that with curing gives a silicone rubber sponge having fine, uniform cells, to a silicone rubber sponge, and to a process for production of a silicone rubber sponge.

BACKGROUND OF THE INVENTION

Due to their outstanding heat and weather resistance and light weight, silicone rubber sponges are used for automotive parts, such as packings, gaskets, and O-rings; as sheath materials for rollers in copiers, and as sealing materials of various kinds. A number of silicone rubber sponge compositions have been proposed to date. Patent Publication 44-461 and Unexamined Patent Application 7-247436, for example, teach silicone rubber sponge compositions containing thermally decomposing organic blowing agents such as azobisisobutyronitrile. However, these compositions give rise to harmful decomposition products during sponge production and thus pose an environmental problem. Patent Publication 7-122000 proposes a silicone rubber sponge composition consisting of an oil-in water type emulsion of dimethylpolysiloxane, an emulsifier, water, and a thickener. However, this composition does not readily give silicone rubber sponges with uniform cells. Further, since oil-in water type emulsions and silicone rubber compositions are basically immiscible, the process of evenly dispersing the silicone rubber composition throughout the composition is time consuming, and throughput is poor.

It is an object of the present invention to provide a silicone rubber sponge composition that does not give rise to harmful decomposition products during sponge production and that with curing gives a silicone rubber sponge having fine, uniform cells.

SUMMARY OF THE INVENTION

The present invention is a silicone rubber sponge composition, a silicone rubber sponge, and a process for making a silicone rubber sponge. The silicone rubber sponge composition comprises (A) 100 parts by weight of an organopolysiloxane gum described by average structural unit $R_aSiO_{(4-a)/2}$, where R is a monovalent hydrocarbon radical or haloalkyl and a is 1.95 to 2.05, (B) 1 to 400 parts by weight of an inorganic filler, (C) 0.01 to 50 parts by weight of hollow thermoplastic resin particles (D) a mixture of (a) water-soluble silicone and (b) water in an amount such that the water in the mixture is equivalent to 0.01 to 10 parts by weight per 100 parts by weight of component (A), and (E) a curing agent in an amount sufficient to cure the composition.

DESCRIPTION OF THE INVENTION

A first embodiment of the present invention is a silicone rubber sponge composition comprising (A) 100 parts by weight of an organopolysiloxane gum described by average structural unit $R_aSiO_{(4-a)/2}$, where R is a monovalent hydrocarbon radical or haloalkyl and a is 1.95 to 2.05, (B) 1 to 400 parts by weight of an inorganic filler, (C) 0.01 to 50 parts by weight hollow thermoplastic resin particles (D) a mixture of (a) water-soluble silicone and (b) water in an amount such that the water in the mixture is equivalent to 0.01 to 10 parts by weight per 100 parts by weight of component (A), and (E) a curing agent in an amount sufficient to cure the composition.

A second embodiment of the present invention is a silicone rubber sponge produced by heat curing of the present silicone rubber sponge composition. A third embodiment of the present invention is a process for production of a silicone rubber sponge comprising the step of curing the present composition by heating to a temperature equal to or above the softening point of the thermoplastic resin component of the hollow thermoplastic resin particles of component (C).

Component (A) is the principal component of the present composition and consists of an organopolysiloxane gum described by average unit formula: $R_aSiO_{(4-a)/2}$, where R is a monovalent hydrocarbon radical or haloalkyl. Examples of the monovalent hydrocarbon radicals include alkyls such as methyl, ethyl, and propyl; alkenyls such as vinyl and allyl; cycloalkyls such as cyclohexyl; aralkyls such as β-phenylethyl; aryls such as phenyl and tolyl; and haloalkyl groups such as 3,3,3-trifluoropropyl and 3-chloropropyl. In the average unit formula for component (A), a is 1.95 to 2.05.

In the present composition, when the curing agent consists of either an alkyl peroxide or a platinum catalyst used concomitantly with an organopolysiloxane containing silicon bonded hydrogen atoms, the organopolysiloxane gum molecule of component (A) must have at least two silicon-bonded alkenyls. Alkenyl here refers, for example, to vinyl, allyl, propenyl, and hexenyl groups. Silicon-bonded organic groups other than alkenyl include alkyls such as methyl, ethyl, and propyl; aryls such as phenyl and tolyl; and haloalkyls such as 3,3,3-trifluoropropyl and 3-chloropropyl. The molecular structure of component (A) may be linear or linear containing branches. The degree of polymerization of component (A) is typically 3,000 to 20,000, with the weight-average molecular weight being $20 \times 10^4$ or above. Component (A) has a Williams plasticity of 50 or greater and preferably 100 or greater, and has the properties of a gum. Component (A) may be a homopolymer, copolymer, or a blend of polymers. Specific examples of the siloxane unit of component (A) are dimethylsiloxane, methylvinylsiloxane, methylphenylsiloxane, and (3,3,3-trifluoropropyl)methylsiloxane units. The molecular chain terminals of component (A) are preferably endblocked by triorganosiloxy or hydroxyl groups. Examples of molecular chain terminal endgroups are trimethylsiloxy, dimethylvinylsiloxy, methylvinylhydroxysiloxy, and dimethylhydroxysiloxy groups. Examples of such organopolysiloxane gums include a copolymer gum of methylvinylsiloxane and dimethylsiloxane that is endblocked at both terminals with dimethylvinylsiloxy groups, dimethylpolysiloxane gum that is endblocked at both terminals with dimethylvinylsiloxy groups, a copolymer gum of methylvinylsiloxane and dimethylsiloxane that is endblocked at both terminals with dimethylhydroxysiloxy groups, and a copolymer gum of methylvinylsiloxane and dimethylsiloxane that is endblocked at both terminals with methylvinylhydroxysiloxy groups.

Examples of the inorganic filler of component (B) are reinforcing fillers such as finely divided silica (e.g. dry process silica or wet process silica) and finely divided silica whose surfaces have been treated with an organochlorosilane, organoalkoxysilane, hexaorganodisilazane, organosiloxane oligomer, or the like; and semi-reinforcing or extending fillers such as powdered quartz, diatomaceous earth, heavy calcium carbonate, light calcium carbonate, magnesium oxide, calcium silicate, mica, aluminum oxide, aluminum hydroxide, and carbon black. In excessively large amounts component (B) is difficult to incorporate in component (A) and accordingly the range 1 to 400 parts by weight per 100 parts by weight of component (A) is preferred. Even more preferred is an amount of component (B) of 1 to 150 parts by weight per 100 parts by weight of component (A).

The hollow thermoplastic resin particles used as component (C) in the present composition serve as nuclei for cell formation and also make cell distribution uniform. An exemplary component (C) is a material consisting of thermoplastic resin shells having an inert gas enclosed therein. Thermoplastic resins include silicone resins, acrylic resins, and polycarbonate resins. In the preferred practice, the thermoplastic resin has a softening point of from 40 to 200° C. and preferably 60 to 180° C. Inert gases include air, nitrogen gas, helium gas, and the like. Component (C) average particle size is preferably within the range of 0.1 to 500 μm, and more preferably 1 to 50 μm. Component (C) may be prepared, for example, by spraying a dispersion of water with a thermoplastic resin dissolved in a solvent from a spray nozzle into a heated air stream and evaporating the organic solvent while granulating the thermoplastic resin. Component (C) is included in the present composition in an amount of 0.01 to 50 parts by weight and preferably 0.1 to 40 parts by weight per 100 parts by weight of component (A).

Component (D) is a characterizing feature of the present composition and is essential in terms of creating fine, uniform cells. Component (a) of component (D) can be any type of water-soluble silicone. Examples of water-soluble silicones are polyoxyalkylene-modified silicone oils, aminoalkyl group-containing silicone oils, amide group-containing silicone oils, carbinol group-containing silicone oils, and the like. Polyoxyalkylene-modified silicone oils are especially preferred. Examples of such polyoxyalkylene-modified silicone oils are organopolysiloxanes of the following average molecular formulas having polyoxyalkylene groups on side chains or terminals.

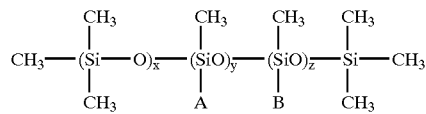

In the formula x and y are integers of 1 or greater, z is 0 or an integer of 1 or greater, A is an organic group described by general formula —$(CH_2)_a$—O—$(C_2H_4O)_p(C_3H_6O)_q$R, where a is an integer from 1 to 3, p is an integer of 1 or greater; q is 0 or an integer of 1 or greater, and R is hydrogen or $C_{1-4}$ alkyl such as methyl, ethyl, or propyl; and B is an organic group described by general formula —$(CH_2)_n$—$CH_3$, where n is an integer of 0 or greater.

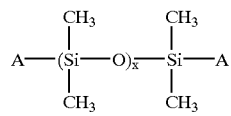

(In the formula, x and A are defined as above.)

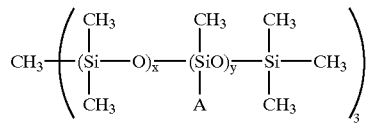

(In the formula, x, y, and A are defined as above.)

To achieve good water solubility, the polyoxyalkylene-modified silicone oil preferably has polyoxyethylene or a polyoxyethylene/polyoxypropylene copolymer as the polyoxyalkylene moiety, with the content thereof being 50% by weight or more of the molecule.

The water of component (a) of component (D) can be any type of "highly pure" water, such as distilled water, purified water, or deionized water.

Component (D) may be readily prepared by mixing component (a) and component (b). To improve the ease of handing and ease of incorporation it is permissible to add a thickener such a powdered silica, provided that the objects of the invention are not impaired thereby.

Component (D) is used in an amount in the present composition such that the amount of component (b) is equivalent to 0.01 to 10 parts by weight, preferably 0.05 to 5 parts by weight per 100 parts by weight of component (A). When the amount of component (b) is less than 0.05, the ability to form fine, uniform cells suffers, while amounts exceeding 5 parts by weight can result in problems such as nonuniform cell formation.

Component (E), the curing agent, is an organic peroxide or a platinum catalyst and an organopolysiloxane containing silicon bonded hydrogen. Examples of the former type curing agent, namely organic peroxides, include benzoyl peroxide, t-butyl perbenzoate, o-methyl benzoyl peroxide, p-methyl benzoyl peroxide, m-methyl benzoyl peroxide, dicumyl peroxide, and 2,5-dimethyl-2,5-di(t-butylperoxy) hexane. The amount of the organic peroxide is preferably 0.1 to 10 parts by weight per 100 parts by weight of component (A).

Of the latter type curing agent, namely a platinum catalyst and an organopolysiloxane containing silicon bonded hydrogen, examples of the platinum catalyst are finely divided platinum, platinum black, chloroplatinic acid, alcohol-modified chloroplatinic acid, chloroplatinic acid olefin complexes, chloroplatinic acid/alkenylsiloxane complexes, and chloroplatinic acid/divinyltetramethyldisiloxane complexes. In preferred practice, the amount of the platinum catalyst, expressed as metallic platinum, is from 0.1 to 500 ppm (weight basis) of the total composition. Organopolysiloxanes containing silicon bonded hydrogen are crosslinking agents, and in the presence of platinum catalysts react with the alkenyl groups in component (A) to cure the present compositions. Examples of organopolysiloxanes containing silicon bonded hydrogen are methylhydriopolysiloxane endblocked at both terminals with trimethylsiloxy groups, a copolymer of methylhydriosiloxane and dimethylsiloxane endblocked at both terminals with trimethylsiloxy groups, a copolymer of methylhydriosiloxane and dimethylsiloxane endblocked at both terminals with dimethylhydriosiloxy groups, and tetramethyltetrahydriocyclotetrasiloxane. In preferred practice when the curing agent is a platinum catalyst and an organopolysiloxane containing silicon bonded hydrogen, the amount of the curing agent will be such that the molar ratio of silicon bonded hydrogen in the curing agent to alkenyl groups in component (A) is 0.5:1 to 10:1. Compounds known in the art as agents for regulating the catalytic activity of platinum catalysts, such as 1-ethynyl-cyclohexanol, 3-methyl-1-penten-3-ol, or benzotriazole, may be added as well.

The present composition comprises components (A) to (E) as described above. In addition, additives known in the art for inclusion in silicone rubber sponge composition may be included as well provided that the objects of the invention are not impaired thereby. Examples of such additives include heat stability agents such as iron oxide, cerium oxide, and fatty acid cerium salts; flame retardants such as manganese carbonate, zinc carbonate, and fumed titanium dioxide; pigments such as red iron oxide and titanium dioxide; and silicone oils such as dimethylsilicone oil and methylphenylsilicone oil.

The present composition can be easily prepared by mixing components (A) to (E) plus any other ingredients that may be required. In preferred practice, component (A) is premixed with component (B) to produce a silicone rubber base compound, to which are then added components (C), (D), and (E). Examples of production equipment are kneader mixers, continuous kneader extruders, and other mixing or blending units.

Silicone rubber sponges may be produced from the present composition by heating to a temperature above the softening point of the thermoplastic resin of the hollow thermoplastic resin particles of component (B) and curing. Silicone rubber sponges are formed by blowing and curing of the composition of the invention. Silicone rubber sponges produced in this way have fine, uniform cells and excellent mechanical strength, making them useful as construction materials, airtight retaining gaskets, fire resistant gaskets, sealing materials, O-rings, and cushioning materials, as well as sheath materials for rollers in copiers and the like.

EXAMPLES

A fuller understanding of the invention is provided through the following examples. Proportions are expressed on a weight basis. Williams plasticity was measured at 25° C. in the following manner. Williams plasticity was measured by a plasticity test in accordance with JIS K6249: 1997 "Testing methods for uncured and cured silicone rubber." A tubular test piece (2 cm$^3$ volume) was prepared from silicone gum. The test piece was sandwiched between pieces of cellophane paper and placed in a parallel plate plastometer (WILLIAMS PLASTOMETER made by Shimadzu Seisakusho) equipped with a dial gage. A 49 N load was applied and after 2 minutes the dial gage was read. Test piece thickness (mm) was recorded and multiplied by 100 to give plasticity.

Reference Example 1

A silicone resin (softening point 80° C., specific gravity 1.2) composed of dimethylsiloxane units and methylphenylsiloxane units in a 22:78 molar ratio was dissolved in dichloromethane, and the resultant solution (solids content 30 wt %) was delivered at a rate of 100 cc/min to a dynamic mixer together with pure water delivered at a rate of 25 cc/min, where they were mixed to produce an aqueous dispersion. Using a two fluid nozzle, the aqueous dispersion was sprayed continuously into a spray dryer with a hot nitrogen gas stream. The hot nitrogen gas stream temperature was 70° C. and pressure was 0.05 MPa. The resultant hollow silicone resin particles were immersed for 24 hours in an aqueous solution consisting of 100 parts pure water and 1 part nonionic surfactant (trimethylnonanol ethylene oxide adduct). Floating hollow silicone resin particles were separated and collected. The hollow silicone resin particles had an average particle size of 40 μm and shell wall average thickness of 4 μm and contained nitrogen gas enclosed therein.

Reference Example 2

An acrylic resin with a softening point of 85° C. (trade name ELVACITE 2008 made by DuPont) was dissolved in dichloromethane and the resultant dichloromethane solution (solids content 10 wt %) was delivered at a rate of 100 cc/min to a dynamic mixer together with pure water delivered at a rate of 25 cc/min, where they were mixed to produce an aqueous dispersion. Using a two fluid nozzle, the dispersion was sprayed continuously into a spray dryer with a hot nitrogen gas stream. The hot nitrogen gas stream temperature was 80° C. and pressure was 0.025 MPa. The resultant hollow acrylic resin particles were immersed for 24 hours in an aqueous solution consisting of 100 parts pure water and 1 part nonionic surfactant (trimethylnonanol ethylene oxide adduct). Floating hollow acrylic resin particles were separated and collected. The hollow acrylic resin particles had an average particle size of 20 μm and shell wall average thickness of 4 μm and contained nitrogen gas enclosed therein.

Reference Example 3

40 Parts of a water-soluble, polyoxyalkylene-modified silicone oil having the average molecular formula $Me_3SiO$-$(Me_2SiO)_7$-$(MeR^1SiO)_3SiMe_3$, where Me is methyl and $R^1$ is a group represented by the formula —$(CH_2)_2$—O—$(C_2H_4O)_{12}$H, (Polyoxyethylene content of the polyoxyalkylene-modified silicone oil was 61 wt %.), and 60 parts of deionized water were evenly mixed in a flask to prepare an aqueous solution (Aqueous Solution A).

Reference Example 4

40 Parts of a water-soluble, polyoxyalkylene-modified silicone oil having the average molecular formula $Me_3SiO$-$(Me_2SiO)_{86}$-$(MeR^2SiO)_4SiMe_3$, where Me is methyl and $R^2$ is a group represented by the formula —$(CH_2)_2$—O—$(C_3H_6O)_{24}$—$(C_2H_4O)_{24}C_3H_7$ (Total polyoxyethylene group/polypropylene content of the polyoxyalkylene-modified silicone oil was 58 wt %), and 60 parts of deionized water were evenly mixed in a flask to prepare an aqueous solution (Aqueous Solution B).

Reference Example 5

40 Parts of a water-soluble, polyoxyalkylene-modified silicone oil having the average molecular formula $Me_3SiO$-$(Me_2SiO)_{15}$-$(MeR^3SiO)_5SiMe_3$, where Me is methyl and $R^3$ is a group represented by the average formula —$(CH_2)_2$—O—$(C_2H_4O)_{13.3}$—$(C_3H_6O)_{5.7}$H (Total polyoxyethylene group/polypropylene content of the polyoxyalkylene-modified silicone oil was 72 wt %), and 60 parts of deionized water were evenly mixed in a flask to prepare an aqueous solution (Aqueous Solution C).

Example 1

100 Parts of an organopolysiloxane gum (Williams plasticity 160, weight-average molecular weight 500,000) composed of 99.6 mol % dimethylsiloxane units and 0.4 mol % methylvinylsiloxane units and endblocked at both terminals with dimethylvinylsiloxy groups, 10 parts of a dimethylsiloxane oligomer endblocked at both terminals with silanol groups and having a viscosity of 60 mPa.s at 25° C., and 40 parts of dry process silica with a specific surface of 200 m$^2$/g were charged to a kneader mixer and kneaded under heating until homogenous to prepare a silicone rubber base compound. To 100 parts of the resultant silicone rubber base compound were added 0.4 part p-methylbenzoyl peroxide, 0.5 part dicumyl peroxide, 1 part of the hollow silicone particles prepared in Reference Example 1, and 1 part of Aqueous Solution A prepared in Reference Example 3. The mixture was kneaded with a pair of rolls to produce a silicone rubber sponge composition. The composition was formed into a sheet 3 mm thick which was then cured by heating in a 230° C. oven for 10 minutes to produce a silicone rubber sponge sheet. The expansion coefficient of the silicone rubber sponge was 2.8. The cells of the silicone rubber sponge sheet were uniform and fine.

Example 2

The silicone rubber sponge composition of Example 1 was charged to a 65 mmφ (φ=diameter) single screw extruder and extruded into a tube profile. The product was heated for 4 minutes in a 230° C. oven to produce a silicone rubber sponge tube. The expansion coefficient of the silicone rubber sponge tube was measured and found to be 3.1. The cells of the silicone rubber sponge tube were uniform and fine.

Example 3

16 cm$^3$ Of the silicone rubber sponge composition of Example 1 was charged to a compression mold (32 cm$^3$ cavity capacity) and heated for 15 minutes at 170° C. to produce a silicone rubber sponge sheet. This silicone rubber sponge sheet nicely filled the mold and had uniform cells.

Example 4

100 Parts of an organopolysiloxane gum (Williams plasticity 160, weight-average molecular weight 500,000) composed of 99.6 mol % dimethylsiloxane units and 0.4 mol % methylvinylsiloxane units and endblocked at both terminals with dimethylvinylsiloxy groups, 5 parts of a dimethylsiloxane oligomer endblocked at both terminals with silanol groups and having a viscosity of 60 mPa.s at 25° C., 15 parts of dry process silica with a specific surface of 200 m$^2$/g, and 25 parts of wet process silica with a specific surface of 130 m$^2$/g were charged to a kneader mixer and kneaded under heating until homogenous to prepare a silicone rubber base compound. To 100 parts of the resultant silicone rubber base compound were added 1 part of a trimethylsiloxyl-endblocked dimethylsiloxane/methylhydriosiloxane copolymer (viscosity 25 mPa.s at 25° C.), 0.002 part of 1-ethynyl-1-cyclohexanol (a hydrosilylation inhibitor), a chloroplatinic acid/tetramethyldivinyldisiloxane complex in an amount equivalent to 3 ppm as platinum atoms based on the organopolysiloxane gum weight, 0.5 part of the hollow acrylic resin particles prepared in Reference Example 2, and 2 parts of Aqueous Solution B prepared in Reference Example 4. The mixture was evenly kneaded with a pair of rolls to produce a silicone rubber sponge composition. The composition was formed into a sheet 3 mm thick which was then cured by heating in a 230° C. oven for 10 minutes to produce a silicone rubber sponge sheet. The expansion coefficient of the silicone rubber sponge sheet was measured and found to be 3.5. The cells of the silicone rubber sponge sheet were uniform and fine.

Example 5

The silicone rubber sponge composition of Example 4 was charged to a 65 mmφ single screw extruder and extruded into a tube profile. The product was heated for 5 minutes in a 230° C. oven to produce a silicone rubber sponge tube. The expansion coefficient of the silicone rubber sponge tube was measured and found to be 3.3. The cells of the silicone rubber sponge tube were uniform and fine.

Example 6

16 cm$^3$ Of the silicone rubber sponge composition of Example 4 was charged to a compression mold (32 cm$^3$ cavity capacity) and heated for 20 minutes at 170° C. to produce a silicone rubber sponge sheet. This silicone rubber sponge sheet nicely filled the mold and had fine, uniform cells.

Example 7

100 Parts of an organopolysiloxane gum (Williams plasticity 160, weight-average molecular weight 500,000) composed of 99.6 mol % dimethylsiloxane units and 0.4 mol % methylvinylsiloxane units and endblocked at both terminals with dimethylvinylsiloxy groups, and 15 parts of acetylene black (DBP absorption 250) were charged to a kneader mixer and kneaded under heating until homogenous to prepare a silicone rubber base compound. To 100 parts of the resultant silicone rubber base compound were added 1 part of a trimethylsiloxyl-endblocked dimethylsiloxane/methylhydriosiloxane copolymer (viscosity 25 mPa.s at 25° C.), 0.002 part of 1-ethynyl-1-cyclohexanol (a hydrosilylation inhibitor), a chloroplatinic acid/1,3-divinyltetramethyldisiloxane complex in an amount equivalent to 3 ppm as platinum atoms based on the organopolysiloxane gum weight, 0.5 part of the hollow acrylic resin particles prepared in Reference Example 2, and 2 parts of Aqueous Solution C prepared in Reference Example 5. The mixture was evenly kneaded with a pair of rolls to produce a silicone rubber sponge composition. The composition was formed into a sheet 3 mm thick which was then cured by heating in a 230° C. oven for 10 minutes to produce a silicone rubber sponge sheet. The expansion coefficient of the silicone rubber sponge sheet was measured and found to be 3. The cells of the silicone rubber sponge sheet were uniform and fine.

Example 8

The silicone rubber sponge composition of Example 7 was charged to a 65 mmφ single screw extruder and extruded into a tube profile. The product was heated for 5 minutes in a 230° C. oven to produce a silicone rubber sponge tube. The expansion coefficient of the silicone rubber sponge tube was measured and found to be 3.1. The cells of the silicone rubber sponge tube were uniform and fine.

Comparative Example 1

A silicone rubber sponge composition was prepared as in Example 1, but omitting the hollow silicone resin particles used in Example 1. The composition was formed into a sheet 3 mm thick which was then cured by heating in a 230° C. oven for 10 minutes to produce a silicone rubber sponge sheet. The expansion coefficient of the silicone rubber sponge sheet was measured and found to be 2.5, but the cells were large and nonuniform.

Comparative Example 2

A silicone rubber sponge composition was prepared as in Example 1, but omitting Aqueous Solution A used in Example 1. The composition was formed into a sheet 3 mm thick which was then cured by heating in a 230° C. oven for 10 minutes to produce a silicone rubber sponge sheet. The silicone rubber sponge sheet had uniform cells, but the expansion coefficient was only 1.2.

Comparative Example 3

The silicone rubber sponge composition of Comparative Example 1 was charged to a 65 mm$\phi$ single screw extruder and extruded into a tube profile. The product was heated for 5 minutes in a 230° C. oven to produce a silicone rubber sponge tube. The expansion coefficient of the silicone rubber sponge tube was measured and found to be 2.8, but the cells were large and nonuniform.

Comparative Example 4

The silicone rubber sponge composition of Comparative Example 2 was charged to a 65 mm$\phi$ single screw extruder and extruded into a tube profile. The product was heated for 5 minutes in a 230° C. oven to produce a silicone rubber sponge tube. The silicone rubber sponge tube had uniform cells, but the expansion coefficient was only 1.2.

Comparative Example 5

16 cm$^3$ of the silicone rubber sponge composition of Comparative Example 1 were charged to a compression mold (32 cm$^3$ cavity capacity) and heated for 15 minutes at 170° C. to produce a silicone rubber sponge sheet. While the silicone rubber sponge sheet filled the mold, the cells were large and nonuniform.

Comparative Example 6

16 cm$^3$ of the silicone rubber sponge composition of Comparative Example 2 were charged to a compression mold (32 cm$^3$ cavity capacity) and heated for 15 minutes at 170° C. to produce a silicone rubber sponge sheet. While the silicone rubber sponge sheet had uniform cells, the expansion coefficient was not adequate for it to fill the mold cavity.

Comparative Example 7

A silicone rubber sponge composition was prepared as in Example 4, but omitting the hollow acrylic resin particles used in Example 4. The composition was formed into a sheet 3 mm thick which was then cured by heating in a 230° C. oven for 10 minutes to produce a silicone rubber sponge sheet. The expansion coefficient of the silicone rubber sponge sheet was measured and found to be 2.8, but the cells of the silicone rubber sponge sheet were large and nonuniform.

Comparative Example 8

A silicone rubber sponge composition was prepared as in Example 4, but omitting Aqueous Solution B used in Example 4. The composition was formed into a sheet 3 mm thick which was then cured by heating in a 230° C. oven for 10 minutes to produce a silicone rubber sponge sheet. The silicone rubber sponge sheet had uniform cells, but the expansion coefficient was only 1.5.

Comparative Example 9

The silicone rubber sponge composition of Comparative Example 7 was charged to a 65 mm$\phi$ single screw extruder and extruded into a tube profile. The product was heated for 5 minutes in a 230° C. oven to produce a silicone rubber sponge tube. The expansion coefficient of the silicone rubber sponge tube was measured and found to be 2.9, but the cells of the sponge were extremely large and nonuniform.

Comparative Example 10

The silicone rubber sponge composition of Comparative Example 8 was charged to a 65 mm$\phi$ single screw extruder and extruded into a tube profile. The product was heated for 5 minutes in a 230° C. oven to produce a silicone rubber sponge tube. The silicone rubber sponge tube had uniform cells, but the expansion coefficient was only 1.5.

Comparative Example 11

16 cm$^3$ of the silicone rubber sponge composition of Comparative Example 7 were charged to a compression mold (32 cm$^3$ cavity capacity) and heated for 15 minutes at 170° C. to produce a silicone rubber sponge sheet. The silicone rubber sponge sheet had cells that were large and nonuniform.

Comparative Example 12

16 cm$^3$ of the silicone rubber sponge composition of Comparative Example 8 were charged to a compression mold (32 cm$^3$ cavity capacity) and heated for 15 minutes at 170° C. to produce a silicone rubber sponge sheet. While the silicone rubber sponge sheet had uniform cells, the expansion coefficient was not adequate for it to fill the mold cavity.

Comparative Example 13

A silicone rubber sponge composition was prepared as in Example 7, but omitting the hollow acrylic resin particles used in Example 7. The composition was formed into a sheet 3 mm thick which was then cured by heating in a 230° C. oven for 10 minutes to produce a silicone rubber sponge sheet. The expansion coefficient of the silicone rubber sponge sheet was measured and found to be 1.5, and the cells of the silicone rubber sponge sheet were large and nonuniform.

Comparative Example 14

A silicone rubber sponge composition was prepared as in Example 7, but omitting Aqueous Solution C used in Example 7. The composition was formed into a sheet 3 mm thick which was then cured by heating in a 230° C. oven for 10 minutes to produce a silicone rubber sponge sheet. The silicone rubber sponge sheet had uniform cells, but the expansion coefficient was only 1.2.

Example 9

The silicone rubber sponge composition prepared in Example 1 was coated onto the outside of a roller core and set in a roller mold. Using a compression mold, the silicone rubber sponge composition was cured by heating for 10 minutes at 170° C. to produce a silicone rubber sponge-sheathed roller. The expansion coefficient of the silicone rubber sponge sheath layer was measured and found to be 2.5, and the cells in the silicone rubber sponge were uniform.

Example 10

The silicone rubber sponge composition prepared in Example 4 was coated onto the outside of a roller core and set in a roller mold. Using a compression mold, the silicone rubber sponge composition was cured by heating for 10 minutes at 170° C. to produce a silicone rubber sponge-sheathed roller. The expansion coefficient of the silicone rubber sponge sheath layer was measured and found to be 2.9, and the cells in the silicone rubber sponge were uniform.

We claim:

1. A silicone rubber sponge composition comprising
   (A) 100 parts by weight of an organopolysiloxane gum described by average structural unit $R_aSiO_{(4-a)/2}$, where R is a monovalent hydrocarbon radical or haloalkyl and a is 1.95 to 2.05,
   (B) 1 to 400 parts by weight of an inorganic filler,
   (C) 0.01 to 50 parts by weight hollow thermoplastic resin particles
   (D) a mixture of (a) water-soluble silicone and (b) water in an amount such that the water in the mixture is equivalent to 0.01 to 10 parts by weight per 100 parts by weight of component (A), and
   (E) a curing agent in an amount sufficient to cure the composition.

2. The silicone rubber sponge composition according to claim 1, where component (C) consists of thermoplastic resin shells having a softening point of from 40° C. to 200° C. and having a gas enclosed therein.

3. The silicone rubber sponge composition according to claim 1, where the thermoplastic resin of component (C) is selected from the group consisting of silicone resin, acrylic resin, and polycarbonate resin.

4. The silicone rubber sponge composition according to claim 1, where component (a) is a water-soluble, polyoxyalkylene-modified silicone oil.

5. The silicone rubber sponge composition according to claim 4, where the polyoxyalkylene in component (a) is a polyoxyethylene or an oxyethylene/oxypropylene copolymer.

6. The silicone rubber sponge composition according to claim 5, where component (a) contains 50% or more by weight of polyoxyethylene or an oxyethylene/oxypropylene copolymer.

7. The silicone rubber sponge composition according to claim 1, where the ratio by weight of component (a) to component (b) is from 5:95 to 95:5.

8. A silicone rubber sponge article comprising the reaction product of a composition comprising
   (A) 100 parts by weight of an organopolysiloxane gum described by average structural unit $R_aSiO_{(4-a)/2}$, where R is a monovalent hydrocarbon radical or haloalkyl and a is 1.95 to 2.05,
   (B) 1 to 400 parts by weight of an inorganic filler,
   (C) 0.01 to 50 parts by weight hollow thermoplastic resin particles
   (D) a mixture of (a) water-soluble silicone and (b) water in an amount such that the water in the mixture is equivalent to 0.01 to 10 parts by weight per 100 parts by weight of component (A), and
   (E) a curing agent in an amount sufficient to cure the composition.

9. A silicone rubber sponge article according to claim 8, where the article is selected from the group consisting of a sheet, tube, gasket, and sheath material for a roller.

10. A silicone rubber sponge article according to claim 8 prepared by a process selected from the group consisting of extrusion molding and compression molding.

11. The silicone rubber sponge composition according to claim 1, where component (A) has a Williams plasticity of 100 or greater at 25° C.

12. The silicone rubber sponge composition according to claim 1 comprising 1 to 150 parts by weight of component (B) per 100 parts by weight of component (A).

13. The silicone rubber sponge composition according to claim 1, where component (C) has a softening point of from 60 to 180° C. and an average particle size of 1 to 50 $\mu$m.

14. The silicone rubber sponge composition according to claim 1 comprising 0.1 to 40 parts of component (C) by weight per 100 parts by weight of component (A).

* * * * *

UNITED STATES PATENT AND TRADEMARK OFFICE
CERTIFICATE OF CORRECTION

PATENT NO.   : 6,365,640 B2
DATED        : April 2, 2002
INVENTOR(S)  : Baba et al.

It is certified that error appears in the above-identified patent and that said Letters Patent is hereby corrected as shown below:

<u>Title page,</u>
Item [*] Notice, delete "by 0 days" and insert -- by 93 days --

Signed and Sealed this

Eleventh Day of May, 2004

JON W. DUDAS
*Acting Director of the United States Patent and Trademark Office*